United States Patent [19]

Asakura et al.

[11] Patent Number: 5,617,175
[45] Date of Patent: Apr. 1, 1997

[54] CAMERA HAVING ELECTRONIC FLASH UNITS

[75] Inventors: Yasuo Asakura; Tatsuya Suzuki, both of Tokyo, Japan

[73] Assignee: Olympus Optical Co., Ltd., Tokyo, Japan

[21] Appl. No.: 341,695

[22] Filed: Nov. 18, 1994

Related U.S. Application Data

[63] Continuation of Ser. No. 97,535, Jul. 27, 1993.

[30] Foreign Application Priority Data

Jul. 29, 1992 [JP] Japan .................................. 4-202487
Aug. 24, 1992 [JP] Japan .................................. 4-224010

[51] Int. Cl.$^6$ ..................................................... G03B 7/08
[52] U.S. Cl. ............................ 396/166; 396/225; 396/310
[58] Field of Search ................................. 354/430, 105, 354/106, 109, 173.1, 127.1, 400, 402, 403

[56] References Cited

U.S. PATENT DOCUMENTS 4,335,943  6/1982  Numata .................................. 354/430
5,016,039  5/1991  Sosa et al. .

FOREIGN PATENT DOCUMENTS 1-280731  11/1989  Japan .
1-280732  11/1989  Japan .
1-280733  11/1989  Japan .

*Primary Examiner*—Russell E. Adams
*Attorney, Agent, or Firm*—Frishauf, Holtz, Goodman, Langer & Chick

[57] ABSTRACT

A camera having a structure in which a colorimetric value is not influenced by the color tone of a main object to be photographed. The camera, in which a film having a data recording section can be loaded, comprises three light receiving portions differing in spectral sensitivity. Based on the output from the three light receiving portions, a colorimetric section measures a color tone of light surrounding the object to be photographed. The light receiving portions are arranged on a front portion of the camera and are arranged so as to receive light at a range larger than an angle of a photographed view. Based on the output of the colorimetric portion, a color correction amount determining portion determines a color correction amount during a printing operation. The data as to the color correction amount is recorded on the data recording section of the film by a recording unit.

6 Claims, 13 Drawing Sheets

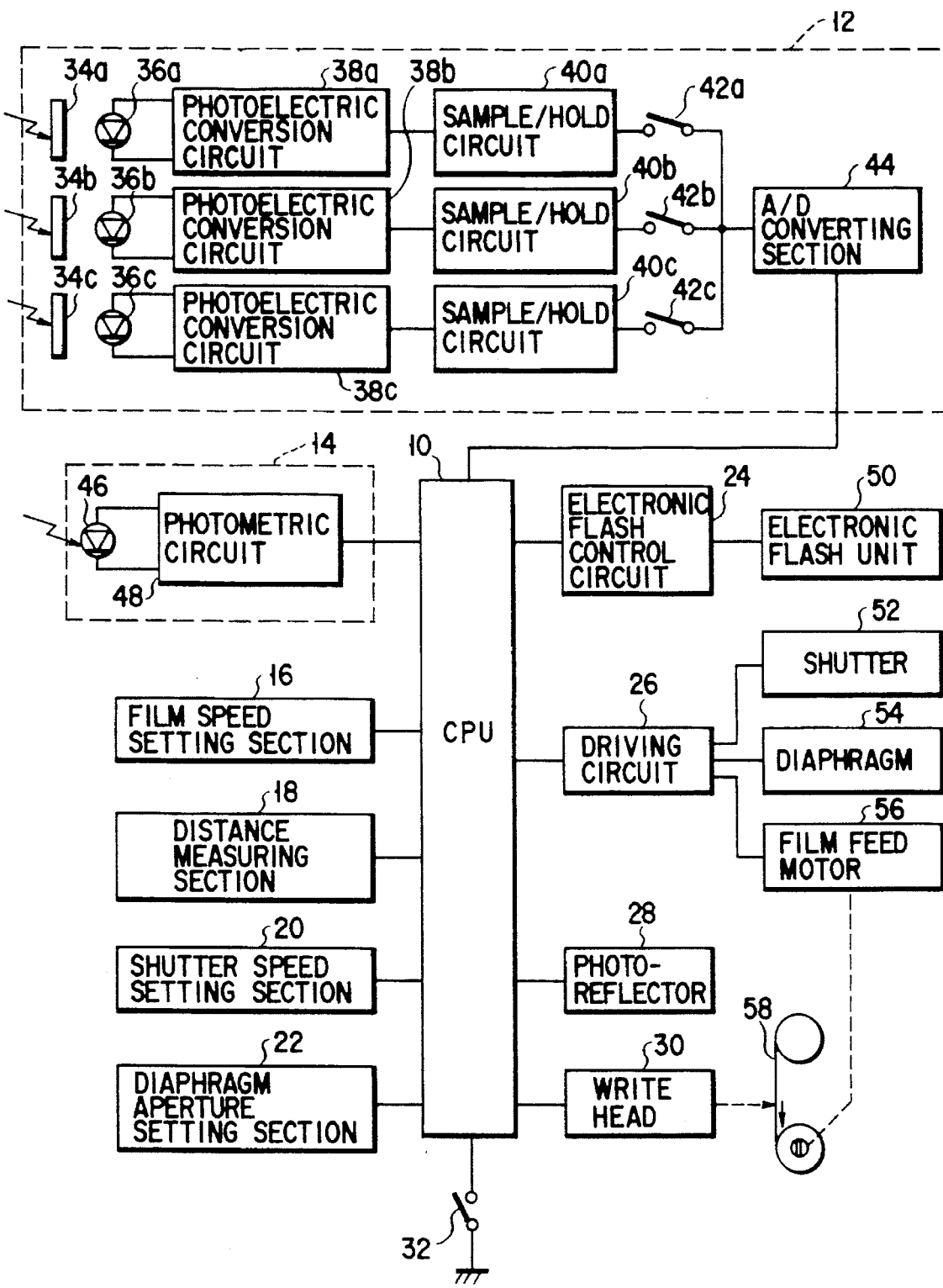
F I G. 1

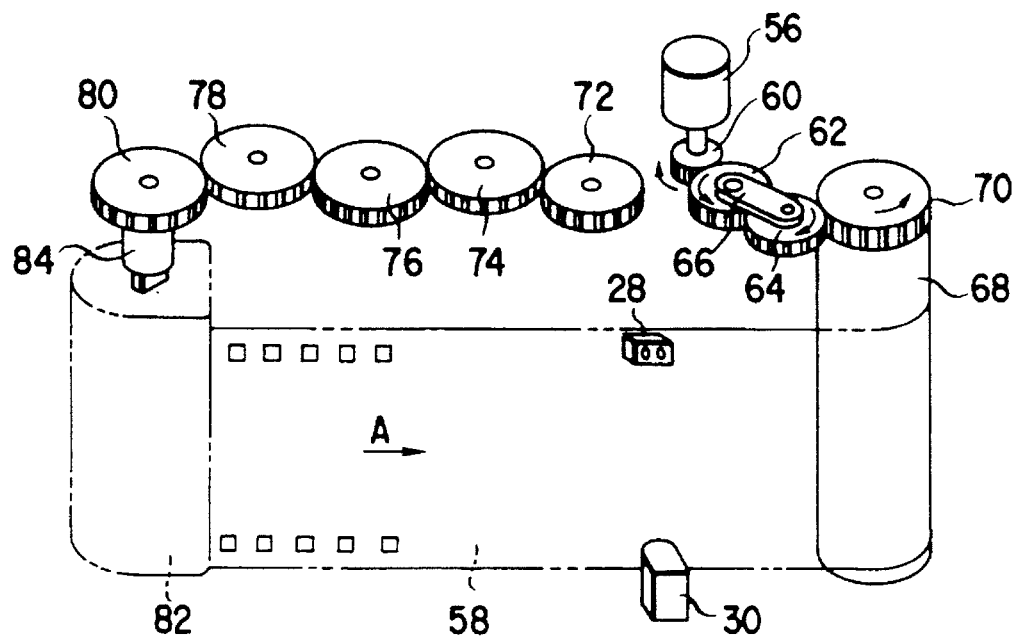
F I G. 3A
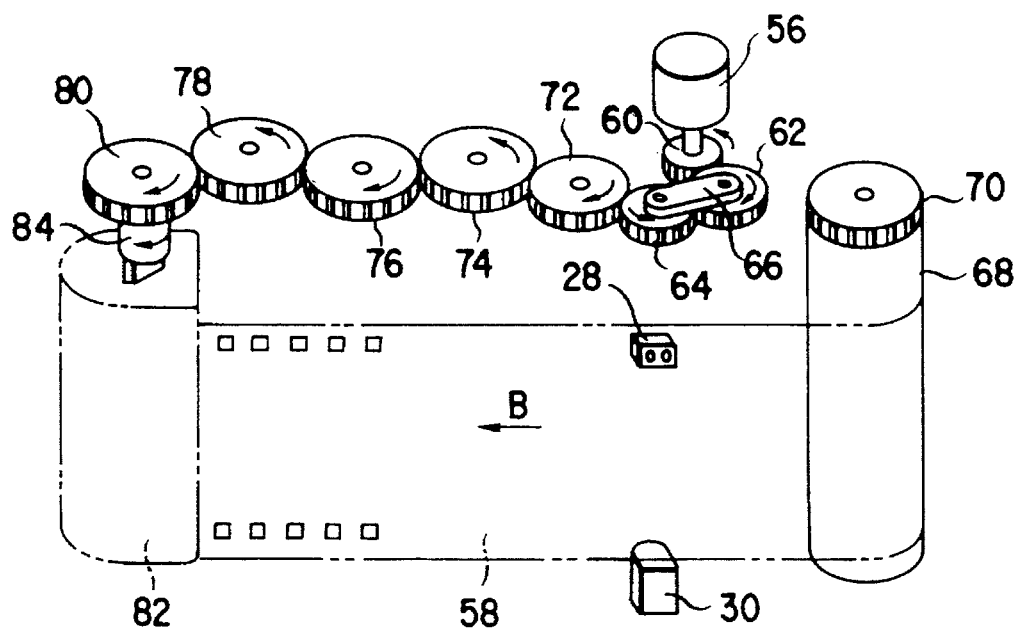
F I G. 3B

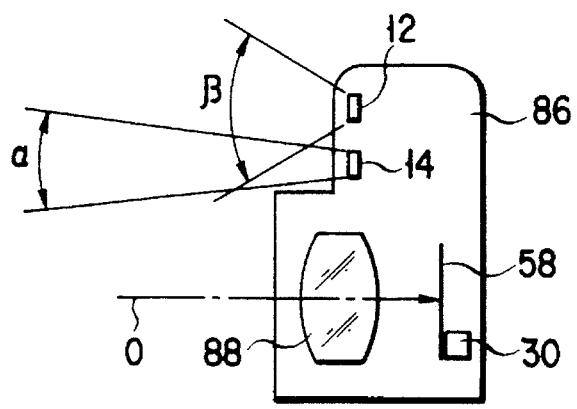
F I G. 4
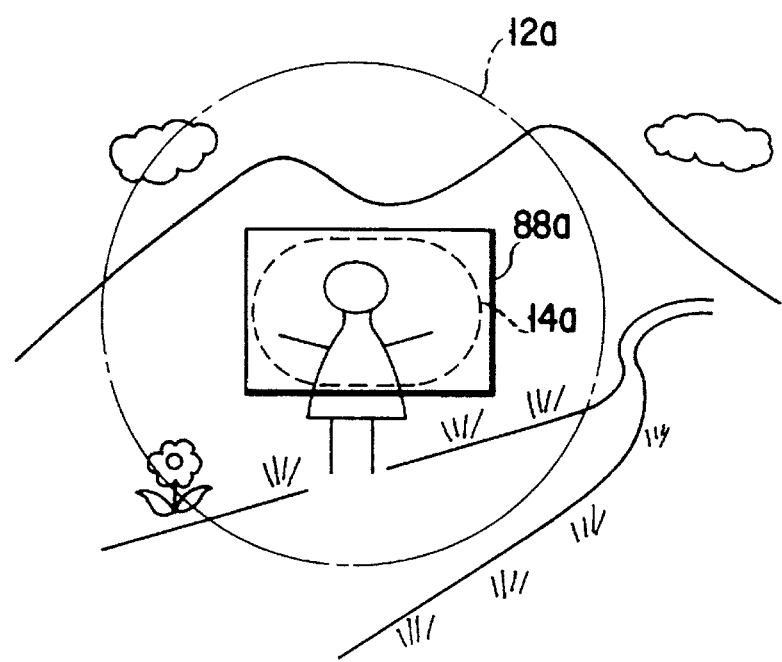
F I G. 5

F I G. 8
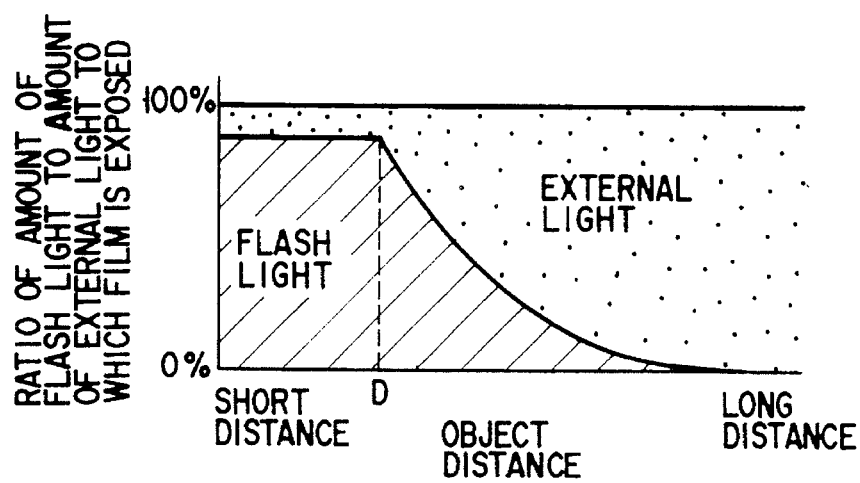
F I G. 9
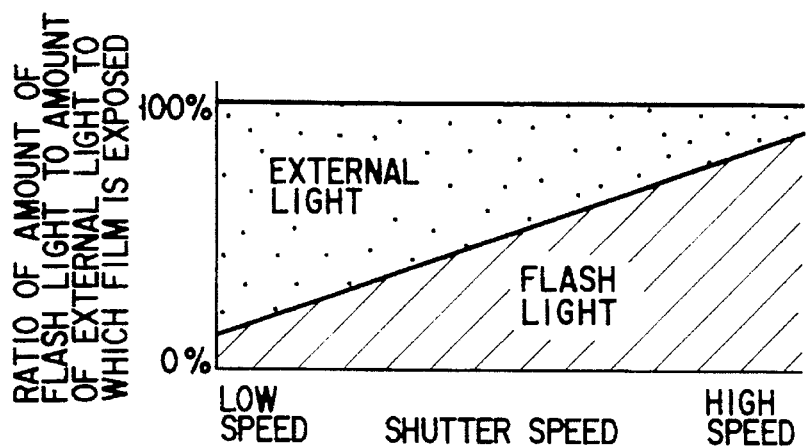
F I G. 10
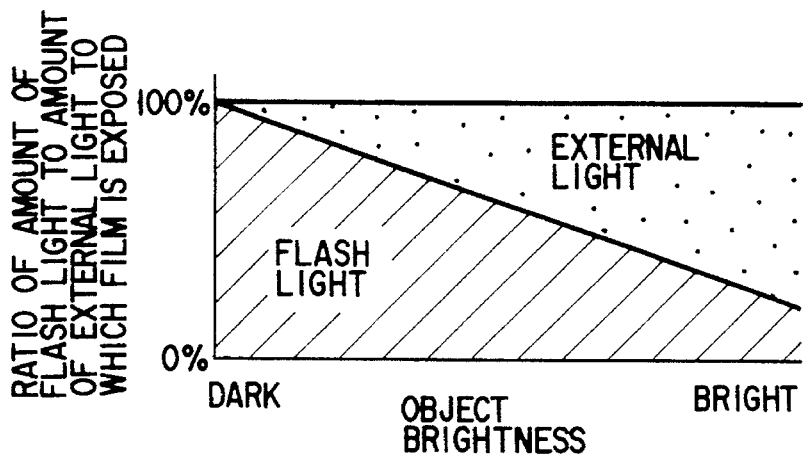

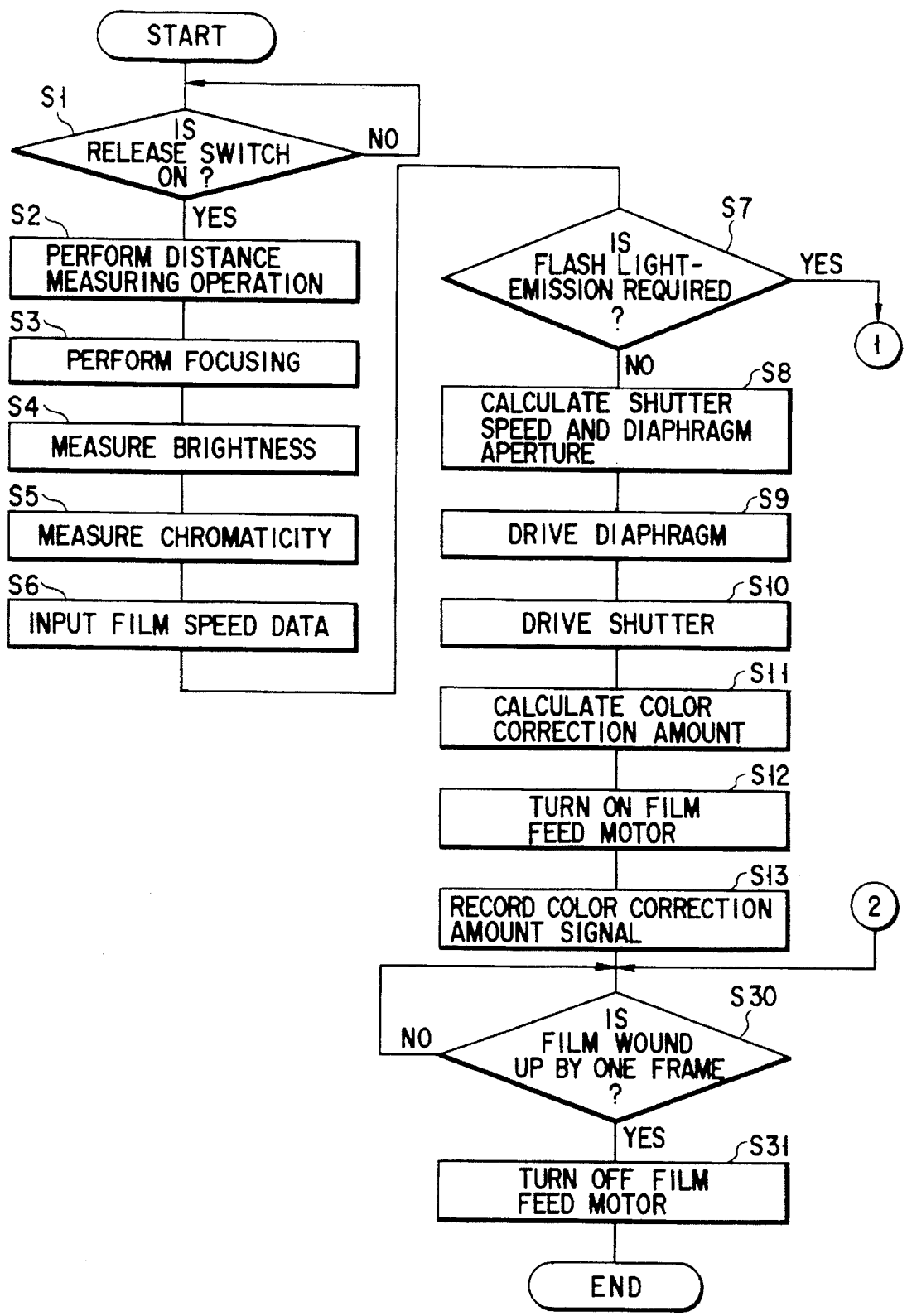
F I G. 11A

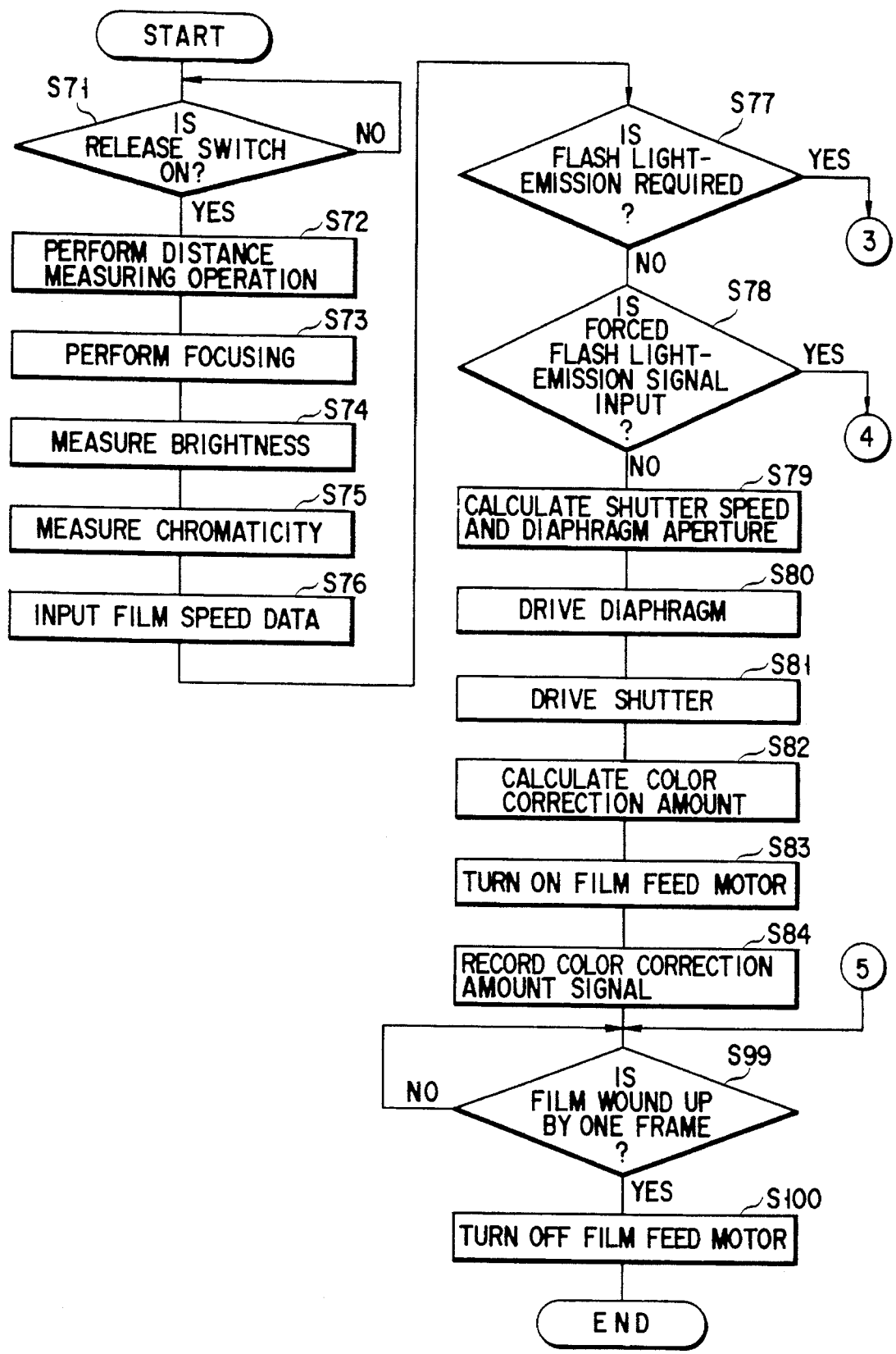
F I G. 13A

CAMERA HAVING ELECTRONIC FLASH UNITS

This application is a continuation, of application Ser. No. 08/097,535, filed Jul. 27, 1993.

BACKGROUND OF THE INVENTION

1. Field of the Invention

The present invention relates to a camera designed to record various photographic data on a film and, more particularly, to a camera having an electronic flash unit for calculating a color correction amount for a printing operation on the basis of photographic conditions and recording the calculated data on a data recording portion on a film in order to obtain a photograph having a natural color tone.

2. Description of the Related Art

Cameras designed to record various data on films have been developed. For example, Published Unexamined Japanese Patent Application No. 1-280731 discloses a camera designed to measure a field brightness, estimate the color temperature of a light source on the basis of the field brightness, and record the resulting data, as color correction data.

Published Unexamined Japanese Patent Application No. 1-280732 discloses a camera system designed to obtain color correction data on the basis of the field color temperature value and the field brightness value and record the resulting data. Note that when the system uses an electronic flash unit, color correction data is set to be a predetermined value.

In addition, Published Unexamined Japanese Patent Application No. 1-280733 discloses a camera designed to measure a field color temperature, obtain color correction data on the basis of the measurement value, and record the resulting data. Note that when the camera has an electronic flash unit, color correction data is obtained by calculating a weighted mean of the color temperature of flash light and a field color temperature on the basis of a predetermined value (if the field distance is small) or an aperture value (if the field distance is large).

However, in the camera disclosed in Published Unexamined Japanese Patent Application No. 1-280731, when an electronic flash unit is used, the color temperature of flash light changes in accordance with the light emission amount. For this reason, color correction cannot be accurately performed with a predetermined color correction amount.

In the camera system disclosed in Published Unexamined Japanese Patent Application No. 1-280732, when an electronic flash unit is used, since an object to be photographed is illuminated with mixed light of flash light and external light, the color temperature is complicated. In addition, accurate color correction cannot be performed with a predetermined color correction amount.

Furthermore, although the idea that color correction data is obtained by calculating a weighted mean of the color temperature of flash light and a field color temperature on the basis of the field distance and the aperture value is described for the camera disclosed in Published Unexamined Japanese Patent Application No. 1-280733, no practical techniques associated with the idea are disclosed.

SUMMARY OF THE INVENTION

It is, therefore, an object to provide a camera having an electronic flash unit for determining a color correction amount in accordance with the light emission amount of the electronic flash unit.

It is another object of the present invention to provide a camera having an electronic flash unit for determining a color correction amount in consideration of the ratio of flash light to external light.

In order to achieve the above objects, according to the present invention, there is provided a camera comprising:

a camera main body in which a film having a data recording portion is loaded;

distance measuring means for measuring a distance to an object to be photographed;

photometric means for measuring a brightness of the object;

flash light emission means for radiating flash light onto the object in an exposure operation in accordance with the object brightness;

film speed setting means for setting a film speed of the film;

exposure element calculating means for calculating an exposure time and/or an aperture value for an exposure operation in accordance with the object brightness and the film speed;

colorimetric means for measuring a color tone of the object;

first color correction data output means for calculating the measured color tone and a preset reference color tone and outputting first color correction data;

first color correction data output means for calculating the measured color tone and a preset reference color tone and outputting first color correction data;

ratio referring means for referring to a table of ratios of external light and the flash light radiated on the object in an exposure operation using the flash light emission means, by using at least one of the object brightness, the object distance, the exposure time, and the aperture value;

second color correction data output means for multiplying the first color correction data by the ratio and outputting second color correction data; and recording means for selecting the first color correction data when the exposure operation is performed without using the flash light emission means, and selecting the second color correction data when the exposure operation is performed by using the flash light emission means, thereby recording the selected data on the data recording portion while the film is wound up.

According to another aspect of the present invention, there is provided a camera comprising:

flash light emission means for radiating flash light onto an object to be photographed;

a camera main body in which a film having a data recording portion is loaded;

means for measuring a distance to the object and outputting distance data;

means for measuring a brightness of the object and outputting brightness data;

means for setting film speed data of the film;

means for calculating exposure time data and/or aperture value data for an exposure operation in accordance with the brightness data and the film speed data;

means for calculating a maximum travel distance of flash light emitted from the flash light emission means on the basis of a maximum light emission amount of the flash light emission means, the aperture value data, and the film speed data;

means for measuring a color tone of the object in synchronism with the exposure operation and outputting color tone data; and means for obtaining color correction data for obtaining a photograph having a natural color tone by using the color tone data, the means correcting the color correction data in accordance with a result obtained by comparing the distance data with the maximum travel distance of the flash light when an exposure operation is performed by using the flash light emission means, and recording the color correction data on a data recording portion of the film while the film is wound up, the color correction data being corrected by (a) setting the color correction data to be a predetermined value when the object distance is smaller than the maximum travel distance of the flash light, and (b) calculating a ratio of the flash light radiated on the object and external light by using the exposure time data as a parameter when the object distance is larger than the maximum travel distance of the flash light.

According to still another aspect of the present invention, there is provided a camera designed to measure a color tone of an object to be photographed and to record color correction data, for use in obtaining a photograph having a natural color tone on the basis of the measured color tone, on a data recording region of a film, the camera comprising means for correcting the color correction data when an exposure operation is performed by using an electronic flash unit, the means having capability of:

a) outputting predetermined color correction data when an emission amount of the electronic flash unit is larger than a predetermined value, and b) outputting color correction data on the basis of a color temperature of the flash light which changes depending on the emission amount, when the emission amount of the electronic flash unit is not larger than the predetermined value.

According to still another aspect of the present invention, there is provided a camera using a film having a signal recording medium, comprising:

an electronic flash unit for radiating flash light onto an object to be photographed within a photographic region;

colorimetric means for measuring a chromaticity of light in the photographic region and outputting a color tone signal;

calculating means for calculating a color correction amount by comparing the color tone signal with a preset reference color tone level;

ratio determining means for determining a ratio of external light and the flash light with respect to the object in a case in which the electronic flash unit is used in an exposure operation, by using at least one of data including a brightness of the object, a distance to the object, an exposure time with respect to a film surface, and an aperture value of a photographic optical system;

changing means for multiplying the color correction amount by the ratio, thereby changing the color correction amount; and recording means for selecting a color correction amount obtained by the calculating means when the exposure operation is performed without using the electronic flash unit, selecting a color correction amount changed by the changing means when the exposure operation is performed by using the electronic flash unit, converting the selected color correction amount into an electrical signal, and recording the signal on the signal recording medium while the film is wound up.

According to still another aspect of the present invention, there is provided a camera using a film having a signal recording medium, comprising:

recording means for recording an electrical signal on the signal recording medium on the film in synchronism with a wind-up operation of the film;

an electronic flash unit for radiating flash light onto an object to be photographed within a photographic region;

colorimetric means for measuring a chromaticity of light in the photographic region and outputting a color tone signal;

calculating means for comparing the color tone signal with a preset reference color tone level to calculate a color correction amount to be recorded on the signal recording medium;

setting means, operated by a photographer, for forcibly causing the electronic flash unit to emit flash light;

comparing means for calculating a light amount ratio of the flash light to external light and comparing the light amount with a preset value when forced light emission of the electronic flash unit is set by the setting means; and control means for causing the recording means to record zero as the color correction amount when a light amount ratio of the flash light to external light is lower than a preset value, and multiplying the light amount ratio by the color correction amount to change the correction amount and causing the recording means to record the correction amount when the light amount ratio is higher than the preset value.

According to still another aspect of the present invention, there is provided a camera using a film having a signal recording medium, comprising:

recording means for recording an electrical signal on the signal recording medium in synchronism with a wind-up operation of the film;

an electronic flash unit for radiating flash light onto an object to be photographed within a photographic region;

colorimetric means for measuring a chromaticity of light in the photographic region and outputting a color tone signal;

calculating means for calculating a color correction amount by comparing the color tone signal with a present reference color tone level;

determining means for determining whether to drive the electronic flash unit;

comparing means for calculating an optimal flash light emission amount by using at least one of data including a brightness of the object, a distance to the object, an exposure time with respect to a film surface, and an aperture value of a photographic optical system when the determining means determines to drive the electronic flash unit, and comparing the optimal emission amount with a maximum light emission amount of the electronic flash unit;

control means for causing the electronic flash unit to emit flash light in the optimal light emission amount when the optimal light emission amount is larger than the maximum light emission amount of the electronic flash unit, and causing the electronic flash unit to emit flash light in the maximum light emission amount when the maximum light emission amount of the electronic flash unit is smaller than the optimal light emission amount; and changing means for determining a ratio of an amount of external light to the maximum light amount of the electronic flash unit with respect to the object by using at least one of the data including the brightness of the object, the distance to the object, the exposure time with respect to the film surface, and the aperture value of the photographic optical system, and multiplying the ratio by the color correction amount to change the color correction amount, wherein the color correction amount is recorded by the recording means when the determining means determines not to drive the electronic flash unit, and a color correction amount changed by the changing means is recorded by the recording means when the determining means determines to drive the electronic flash unit, and the electronic flash unit is caused to emit flash light in the maximum light emission amount.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the overall arrangement of a camera according to an embodiment of the present invention;

FIGS. 3A and 3B are perspective views showing a film feed unit of the camera according to the first embodiment of the present invention, in which FIG. 3A shows a state wherein a film is wound around a take-up spool, and FIG. 3B shows a state wherein the film is rewound into a film magazine;

FIG. 4 is a view showing an arrangement of a colorimetric section and a photometric section in the first embodiment of the present invention;

FIG. 5 is a view showing examples of the light-reception ranges of the colorimetric section and the photometric section in the first embodiment of the present invention;

FIG. 8 is a graph showing the ratio of the amount of flash light, to which a film is exposed, to the amount of external light, in relation to the object distance;

FIG. 9 is a graph showing the ratio of the amount of flash light, to which a film is exposed, to the amount of external light, in relation to the shutter speed;

FIG. 10 is a graph showing the ratio of the amount of flash light, to which a film is exposed, to the amount of external light, in relation to the object brightness;

FIGS. 11A and 11B are flow charts for explaining an operation of the second embodiment;

FIGS. 13A and 13B are flow charts for explaining an operation of the fourth embodiment.

DETAILED DESCRIPTION OF THE PREFERRED EMBODIMENTS

Figure 2:
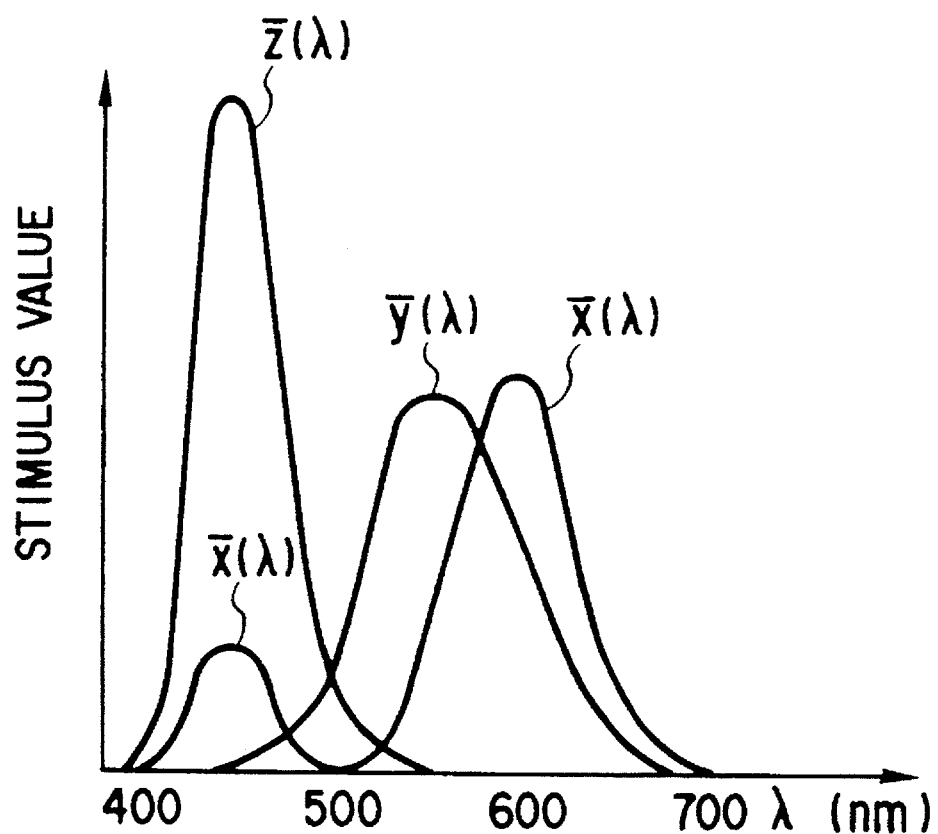
FIG. 2 is a graph showing the spectral sensitivities of spectrum stimulus values obtained by an optical filter and a light-receiving element in FIG. 1.

Embodiments of the present invention will be described below with reference to the accompanying drawings.

FIG. 1 is a block diagram showing the overall arrangement of a camera according to an embodiment of the present invention. Referring to FIG. 1, the following components are connected to a CPU 10 for controlling the overall operation of the camera: a colorimetric section 12, a photometric section 14, a film speed setting section 16, a distance measuring section 18, a shutter speed setting section 20, a diaphragm aperture setting section 22, an electronic flash control circuit 24, a driving circuit 26, a photoreflector 28, a write head 30, and a release switch 32.

The colorimetric section 12 includes optical filters 34a, 34b, and 34c and light-receiving elements 36a, 36b, and 36c, and has spectral sensitivities of spectrum stimulus values represented by $\bar{x}$, $\bar{y}$, and $\bar{z}$ respectively obtained by combinations of the optical filter 34a and the light-receiving element 36a, the optical filter 34b and the light-receiving element 36b, and the optical filter 34c and the light-receiving element 36c. In this case, these spectral sensitivities of spectrum stimulus values exhibit the characteristics shown in FIG. 2.

Light beams received by the light-receiving elements 36a, 36b, and 36c are photoelectrically converted by photoelectric conversion circuits 38a, 38b, and 38c and are sampled/held by sample/hold circuits 40a, 40b, and 40c, respectively. Outputs from the sample/hold circuits 40a, 40b, and 40c are respectively selected by selection switches 42a, 42b, and 42c. The outputs from the respective sample/hold circuits are sequentially A/D-converted by an A/D converting circuit 44, and the resulting digital signals are output to the CPU 10.

The photometric section 14 is constituted by a light-receiving element 46 and a photometric circuit 48. In the light-receiving element 46, the brightness of an object to be photographed is measured. In the photometric circuit 48, an output from the light-receiving element 46 is photoelectrically converted. The measurement value is then output to the CPU 10.

The film speed setting section 16 is constituted by a DX code read switch, and the distance measuring section 18 is constituted by an AF (auto focus) sensor for measuring the distance to the object. The shutter speed setting section 20 is constituted by a manual input switch, and the diaphragm aperture setting section 22 is constituted by a manual input switch.

The electronic flash control circuit 24 causes an electronic flash unit 50 to emit flash light in response to a signal from the CPU 10. The electronic flash unit 50 is constituted by a xenon tube, a reflector, or the like.

The driving circuit 26 serves to drive a known shutter 52, a known diaphragm 54, and a known film feed motor 56 in accordance with control signals from the CPU 10. The shutter 52 is operated by the driving circuit 26 at a predetermined shutter speed. The aperture value of the diaphragm 54 is changed to a predetermined value by the driving circuit 26. The film feed motor 56 winds up/rewinds a film 58 having a magnetic recording portion.

The photoreflector 28 detects movement of perforations (not shown) of the film 58 and outputs a feed signal to the CPU 10.

The write head 30 records a predetermined signal on a magnetic coat surface of the film 58 and is controlled by the CPU 10.

The release switch 32 is turned on/off by a release operation of a photographer.

FIGS. 3A and 3B are perspective views showing a film feed unit of the camera according to the first embodiment of the present invention, when viewed from the rear side of the camera. FIG. 3A shows a state wherein a film is wound around a take-up spool. FIG. 3B shows a state wherein the film is rewound into a film magazine.

A pinion gear 60 is mounted on the output shaft of the film feed motor 56 disposed in the camera main body. The pinion gear 60 is meshed with a sun gear 62. The sun gear 62 is meshed not only with the pinion gear 60 but also with a planetary gear 64. The planetary gear 64 is supported to revolve around the rotational axis of the sun gear 62 through a gear arm 66.

A take-up spool 68 for taking up the film 58 is rotatably disposed in a film take-up chamber (not shown) arranged on the right side of the camera main body, viewed from the rear side thereof. A spool gear 70 is integrally formed on the upper end face of the take-up spool 68 to be meshed with the planetary gear 64 when the planetary gear 64 revolves counterclockwise. In this case, the film 58 travels in the direction indicated by an arrow A in FIG. 3A.

An idle gear 72 is disposed at a position where it is meshed with the planetary gear 64 when the planetary gear 64 revolves clockwise. In this case, as shown in FIG. 3A, the planetary gear 64 is coupled to a coupler gear 80 through the idle gears 72, 74, 76, and 78. In this case, the film 58 travels in the direction indicated by an arrow B in FIG. 3B.

A magazine housing chamber is formed on the left side of the camera main body, viewed from the rear side thereof. In the magazine housing chamber, a film magazine 82 indicated by alternate long and two short dashed lines is housed. As shown in FIG. 3B, the coupler gear 80 having a coupler 84 having a distal end protruding in the form of a symbol "–" is rotatably disposed above the magazine housing chamber. This coupler 84 is engaged with a groove of a spool formed on the film magazine 82 so as to be integrally rotated about the axis of the film magazine 82 together with the spool. The coupler gear 80 is always meshed with the idle gear 78.

The photoreflector 28 fixed to the camera main body and designed to output a pulse signal every time a perforation of the film 58 passes the photoreflector 28 is disposed at a position slightly closer to the center of the camera main body than the take-up spool 68 and at a height where the photoreflector 28 opposes each perforation of the film 58. The magnetic head (write head) 30 for recording photographic data on the magnetic coat surface on the lower surface of the film 58 is disposed on the lower surface side of the film 58.

A film feed operation will be described next.

When the film 58 is wound up, as shown in FIG. 3A, the film feed motor 56 is rotated in the direction indicated by the arrow in accordance with a control operation of the CPU 10, thus rotating the take-up spool 68 in the direction indicated by the arrow. With this operation, the film 58 is extracted from the film magazine 82 in the direction indicated by the arrow A in FIG. 3A to be taken up by the take-up spool 68. At the same time, the feed amount of the film 58 is detected by the photoreflector 28, and the film feed motor 56 is stopped when the film 58 is wound up by one frame. In addition, during the film wind-up operation, the write head 30 records photographic data on the magnetic recording portion of the film 58 in response to a signal from the CPU 10.

When the film 58 is to be rewound into the film magazine 82, as shown in FIG. 3B, the film feed motor 56 is rotated in the direction indicated by the arrow in accordance with a control operation of the CPU 10. The coupler gear 80 and the coupler 84 are then rotated in the direction indicated by the arrow, thereby rewinding the film 58, which is taken up by the take-up spool 68, into the film magazine 82. At this time, the film 58 is moved in the direction indicated by the arrow B in FIG. 3B.

FIG. 4 shows the arrangement of the colorimetric section 12 and the photometric section 14 in the first embodiment of the present invention. FIG. 5 shows the light-reception ranges of the colorimetric section 12 and the photometric section 14.

Referring to FIG. 4, a taking lens 88 having an optical axis O is disposed at a front surface portion of a camera main body 86. The photometric section 14 is disposed above the taking lens 88, and the colorimetric section 12 is disposed above the photometric section 14. The film 58 is set on the rear side of the taking lens 88 in the camera main body 86. The write head 30 is brought into contact with the film 58 in the manner shown in FIG. 4.

The light-reception angles of the photometric section 14 and the colorimetric section 12 are respectively represented by $\alpha$ and $\beta$. FIG. 5 shows light-reception ranges 14a and 12a of the photometric section 14 and the colorimetric section 12.

Referring to FIG. 5, reference numeral 88a denotes a photographic view angle at which photography is performed by the taking lens 88. The light-reception range 14a of the photometric section 14 is almost the same as the photographic view angle 88a or part of the photographic view angle 88a. With this arrangement, a photometric operation to expose the film 58 to a proper amount of light can be performed without being influenced by a brightness difference due to ambient light.

The light-reception range 12a of the colorimetric section 12 is set to be larger than the photographic view angle 88a so that the chromaticity of ambient light without being influenced by the colors of an object to be photographed. The light-reception angle $\beta$ of the colorimetric section 12 is set to be larger than the light-reception angle $\alpha$ of the photometric section 14.

Figure 6:
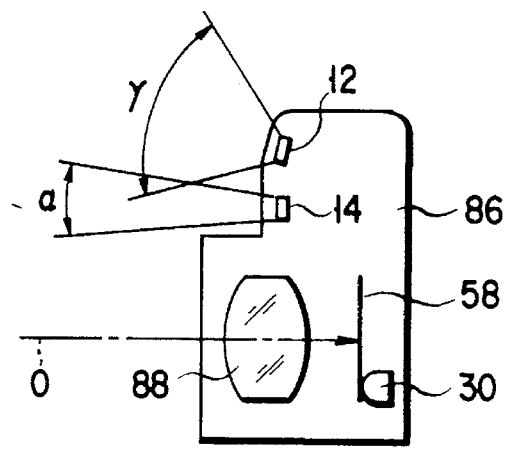
FIG. 6 is a view showing an arrangement of the colorimetric section and the photometric section.
Figure 7:
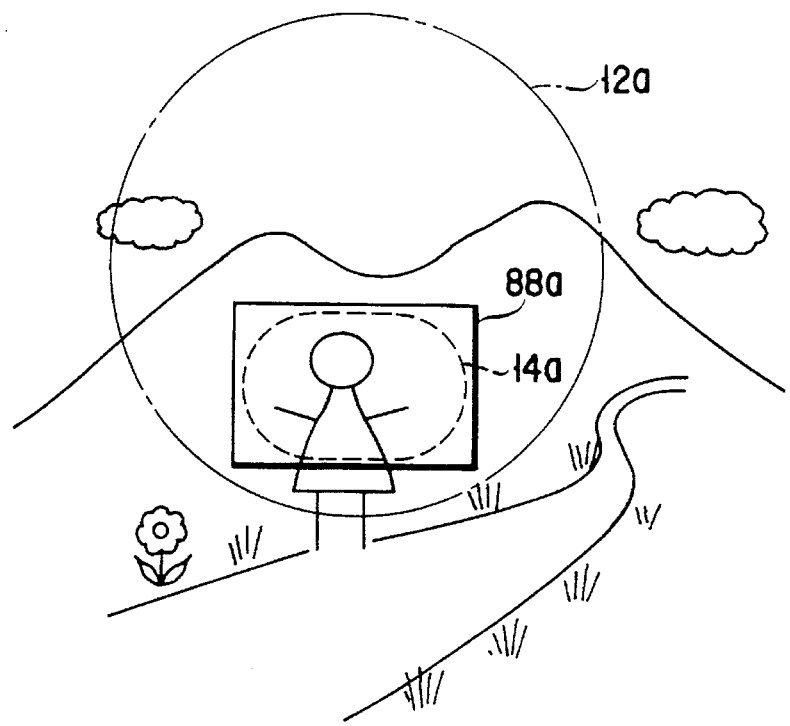
FIG. 7 is a view showing other examples of the light-reception ranges of the colorimetric section and the photometric section.

FIG. 6 shows another arrangement of the colorimetric section 12 and the photometric section 14 described above. FIG. 7 shows other light-reception ranges of the colorimetric section 12 and the photometric section 14. The same reference numerals in FIGS. 6 and 7 denote the same parts as in FIGS. 4 and 5, and a description thereof will be omitted.

The arrangement and the light-reception ranges shown in FIGS. 6 and 7 are different from those shown in FIGS. 4 and 5 in that the colorimetric section 12 disposed above the photometric section 14 is directed upward as compared with the first embodiment in FIG. 4. That is, the light-reception range 12a of the colorimetric section 12 is wider than the photographic view angle 88a and is set at an upper oblique position. A light-reception angle $\lambda$ of the colorimetric section 12 is set to be larger than a light-reception angle $\alpha$ of the photometric section 14, similar to the above-described case.

The advantage of the arrangement and the light-reception ranges shown in FIGS. 6 and 7 will be described below.

In general, a light source is often located at an upper position either outdoors or indoors, whereas a ground, a floor, or the like having a predetermine color is located at a lower position. Therefore, in many cases, the chromaticity of a light source can be more accurately measured when the colorimetric section 12 performs a measuring operation at an upper oblique position.

FIGS. 8, 9, and 10 respectively show the ratios of the amounts of flash light to those of external light to which a film is exposed, in relation to the object distance, the shutter speed, and the object brightness.

The first to third embodiments of the present invention will be described below with reference to FIGS. 8, 9, and 10.

An operation of the first embodiment of the present invention will be described first with reference to FIG. 8 and the flow charts shown in FIGS. 11A and 11B.

FIG. 8 shows the ratio of the amount of flash light, to which a film is exposed, to the amount of external light, in relation to the object distance. Referring to FIG. 8, the abscissa represents the object distance; and the ordinate, the ratio of the amount of flash light, to which the film is exposed, to the amount of external light. The sum of the percentage of flash light indicated by the hatched portion and the percentage of external light (field light) is 100%, indicating a proper exposure amount (the same applies to FIGS. 9 and 10).

The travel distance D of flash light is determined by the maximum flash light emission amount, the aperture value of the photographic lens, and a film speed. When an object to be photographed is located at a distance shorter than the travel distance D, the ratio of flash light is very high, and hence the influence of external light is very small. For this reason, color correction is not generally required. When, however, the object is located at a distance longer than the travel distance D, underexposure occurs with only flash light. For this reason, long-time exposure is required, and an exposure operation is influenced by external light.

Figure 11B:
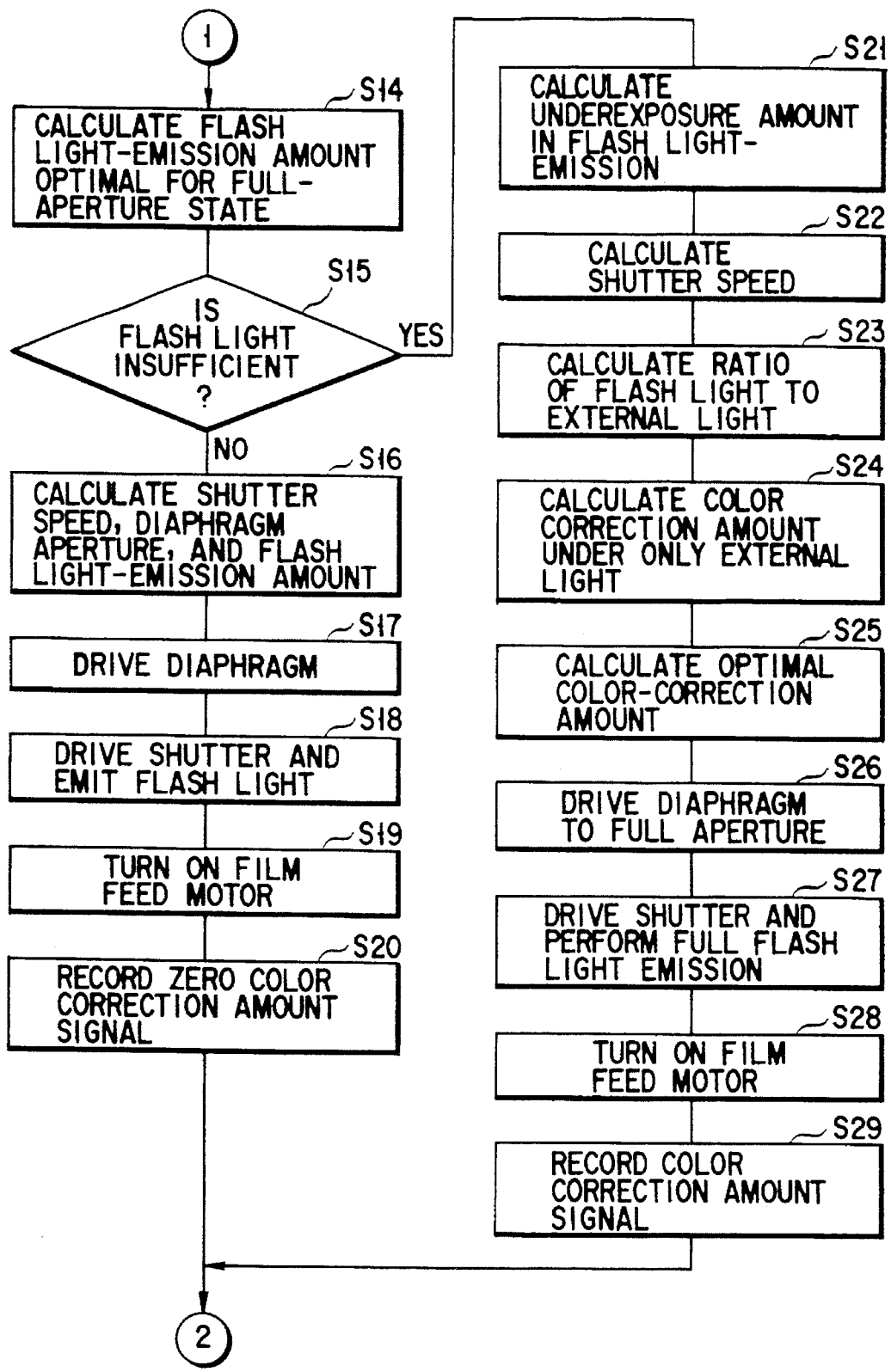

In the flow charts shown in FIGS. 11A and 11B, when the release switch 32 is turned on upon a release operation (step S1), a distance measuring operation is started by the distance measuring section 18 (step S2), and focusing is performed (step S3). Subsequently, the photometric section 14 measures the brightness of an object to be photographed, and outputs the measurement value to the shutter speed setting section 20 (step S4). The colorimetric section 12 measures a field chromaticity and outputs a color tone signal to the CPU 10 (step S5). The CPU 10 receives a film speed value set by the film speed setting section 16 (step S6).

The CPU 10 checks on the basis of outputs from the photometric section 14 and the film speed setting section 16 whether the brightness of an object to be photographed is higher than a predetermined brightness (step S7). If it is determined that flash light emission is not required, a proper shutter speed and a proper aperture value are calculated on the basis of the input values from the photometric section 14 and the film speed setting section 16 (step S8). Subsequently, the diaphragm 54 and the shutter 52 are driven/controlled by the driving circuit 26 in accordance with the calculated values (steps S9 and S10), thus exposing the film 58.

The CPU 10 compares the color tone signal input from the colorimetric section 12 with a reference color tone level to calculate an optimal color correction amount for a printing operation (step S11). The CPU 10 operates the film feed motor 56 through the driving circuit 26 (step S12) to wind up the film 58 by one frame. At the same time, the CPU 10 outputs the calculated color correction amount signal to the write head 30 so as to record the color correction amount data for a printing operation on the film 58 during a wind-up operation (step S13).

If it is determined in step S7 on the basis of the outputs from the photometric section 14 and the film speed setting section 16 that the object brightness is lower than the predetermined brightness, and flash light emission is required, an optimal flash light-emission amount in a full-aperture state is calculated (step S14). It is then checked on the basis of the input values from the photometric section 14, the film speed setting section 16, and the distance measuring section 18 whether the object is located at a long distance and the flash light-emission amount is insufficient (step S15). If the flash light-emission amount is not insufficient, a proper shutter speed, a proper aperture value, and a proper flash light-emission amount are calculated on the basis of the input values from the photometric section 14, the film speed setting section 16, and the distance measuring section 18 (step S16). The diaphragm 54 and the shutter 52 are driven/controlled by the driving circuit 26 in accordance with the calculated values, and the flash light emission time of the electronic flash unit 50 is controlled by the electronic flash control circuit 24 in accordance with the calculated value while the shutter 52 is open (steps S17 and S18).

The CPU 10 operates the film feed motor 56 to wind up the film 58 by one frame, similar to the above-described case (step S19). At this time, the object light during exposure is not influenced much by the chromaticity of external light and is almost determined by the chromaticity of flash light. In this case, since flash light is generally emitted at a color tone level at which no color correction is required, color correction data corresponding to a zero color correction amount for a printing operation is recorded on the magnetic recording portion of the film (step S20).

If it is determined in step S15 that the flash light-emission amount is insufficient, it is determined that control is to be performed in a full-aperture state, and an underexposure value under only flash light is calculated on the basis of the output signals from the photometric section 14, the film speed setting section 16, and the distance measuring section 18 (step S21). A shutter speed at which external light corresponding to the underexposure value can be received is calculated on the basis of the input value from the photometric section 14 (step S22). The ratio of flash light radiated on the object to external light is calculated (step S23).

This ratio is calculated by the following method. The graph shown in FIG. 9, which shows the ratio of the amount of flash light, to which an object is exposed, to the amount of external light, in relation to the shutter speed, is stored in a ROM (not shown) of the CPU 10 in the form of a table. A ratio is then obtained from this table by using a shutter speed as a reference parameter. This is an optimal method of obtaining ratios. Ratios can be obtained in the same manner even by using other parameters.

Subsequently, the color tone signal input from the colorimetric section 12 is compared with the reference color tone level, and a color correction amount under only external light is calculated (step S24). This calculated color correction amount is multiplied by the calculated ratio of external light to calculate an optimal color correction amount for a printing operation (step S45). The diaphragm 54 is driven/ controlled to the full aperture state (step S26). At the same time, the shutter 52 is driven/controlled in accordance with the calculated value, and the electronic flash unit 50 is controlled to emit flash light in the maximum emission amount by the electronic flash control circuit 24 while the shutter 52 is open (step S27).

When an exposure operation is completed, the film feed motor 56 is operated by the driving circuit 26 to wind up the film 58 by one frame (step S28). At the same time, the calculated color correction amount signal is output to the write head 30, and the color correction amount data for a printing operation is recorded on the film 58 during the film wind-up operation (step S29).

When the film 58 is wound up by one frame (step S30), the CPU 10 stops the film feed motor 56 (step S31).

As described above, in the first embodiment, photography is performed with a proper light amount regardless of the object distance in flash light emission, and the color tone of light radiated on the object, which changes depending on the object distance, is calculated and recorded, as color correction data, on the film, thereby allowing optimal color correction in a printing operation.

When an aperture value desired by the photographer is set by using the diaphragm aperture setting section 22, the above-mentioned aperture value set as a full-aperture value is replaced with the set value. With this simple replacement, the same effect as described above can be obtained by performing calculations and operations similar to those described above.

The second embodiment of the present invention will be described next with reference to FIG. 9 and the flow chart shown in FIG. 12.

FIG. 9 is a graph showing the ratio of the amount of flash light, to which a film is exposed, to the amount of external light, in relation to the shutter speed. Referring to FIG. 9, the abscissa represents the shutter speed; and the ordinate, the ratio of the amount of flash light to the amount of external light, similar to FIG. 8.

When the shutter speed is high, the ratio of flash light is very high, and hence exposure is not influenced much by external light. For this reason, color correction is not generally required. When, however, slow synchronization is performed at a slow shutter speed, the influence of external light is increased, and hence color correction is required.

Figure 12:
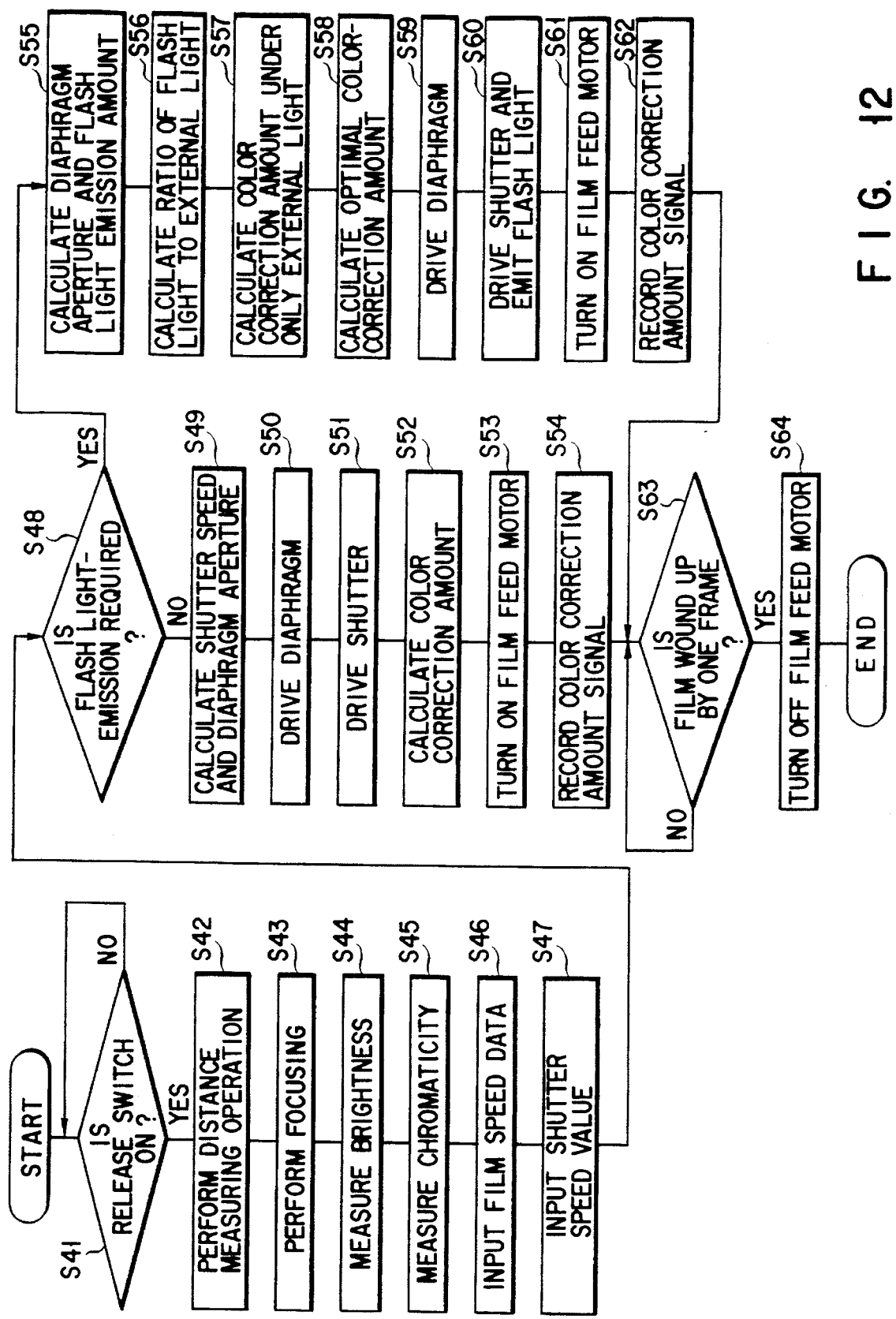
FIG. 12 is a flow chart for explaining an operation of the third embodiment.

In the flow chart shown in FIG. 12, after film speed data is input (step S46), the photographer sets a shutter speed by using a shutter speed setting section 20 (step S47). If it is determined on the basis of outputs from a photometric section 14, a film speed setting section 16, and the shutter speed setting section 20 or a forced flash light emission signal (not shown) that flash light emission is required (step S48), a CPU 10 performs the operations in the subsequent steps S55 to S62. Note that steps S41 to S46, steps S48 to S54, and steps S63 and S64 are the same as steps S1 to S6, steps S7 to S13, and steps S30 and S31 in the flow charts shown in FIGS. 11A and 11B, and hence a description thereof will be omitted.

As described above, if it is determined in step S48 that flash light emission is required, a proper aperture value and a proper flash light-emission amount are calculated on the basis of input values from the photometric section 14, the film speed setting section 16, a distance measuring section 18, and the shutter speed setting section 20 (step S55). The ratio of the amount of flash light radiated on the object and the amount of external light is calculated (step S56). A color tone signal input from a colorimetric section 12 is then compared with a reference color tone level, and a color-correction amount under only external light is calculated (step S57).

The calculated color-correction amount is multiplied by the calculated ratio of external light to calculate an optimal color-correction amount for an actual printing operation (step S58). A diaphragm 54 and a shutter 52 are driven/controlled by a driving circuit 26 in accordance with the calculated value and the set value, respectively. At the same time, an electronic flash unit 50 is controlled by an electronic flash control circuit 24 to emit flash light in accordance with the calculated value while the shutter 52 is open (steps S59 and S60).

When an exposure operation is completed, a film feed motor 56 is operated by the driving circuit 26 to wind up a film 58 by one frame (step S61). At the same time, the calculated color-correction amount signal is output to a write head 30 to record the color-correction amount data for a printing operation on the film 58 during the film wind-up operation (step S62).

As described above, in the second embodiment, photography is performed with a proper light amount regardless of the shutter speed in flash light emission. In addition, the color tone of light radiated on the object within an exposure time, which color tone changes depending on the shutter speed, is calculated and is recorded, as color correction data, on the film, thereby allowing optimal correction in a printing operation.

Figure 13B:
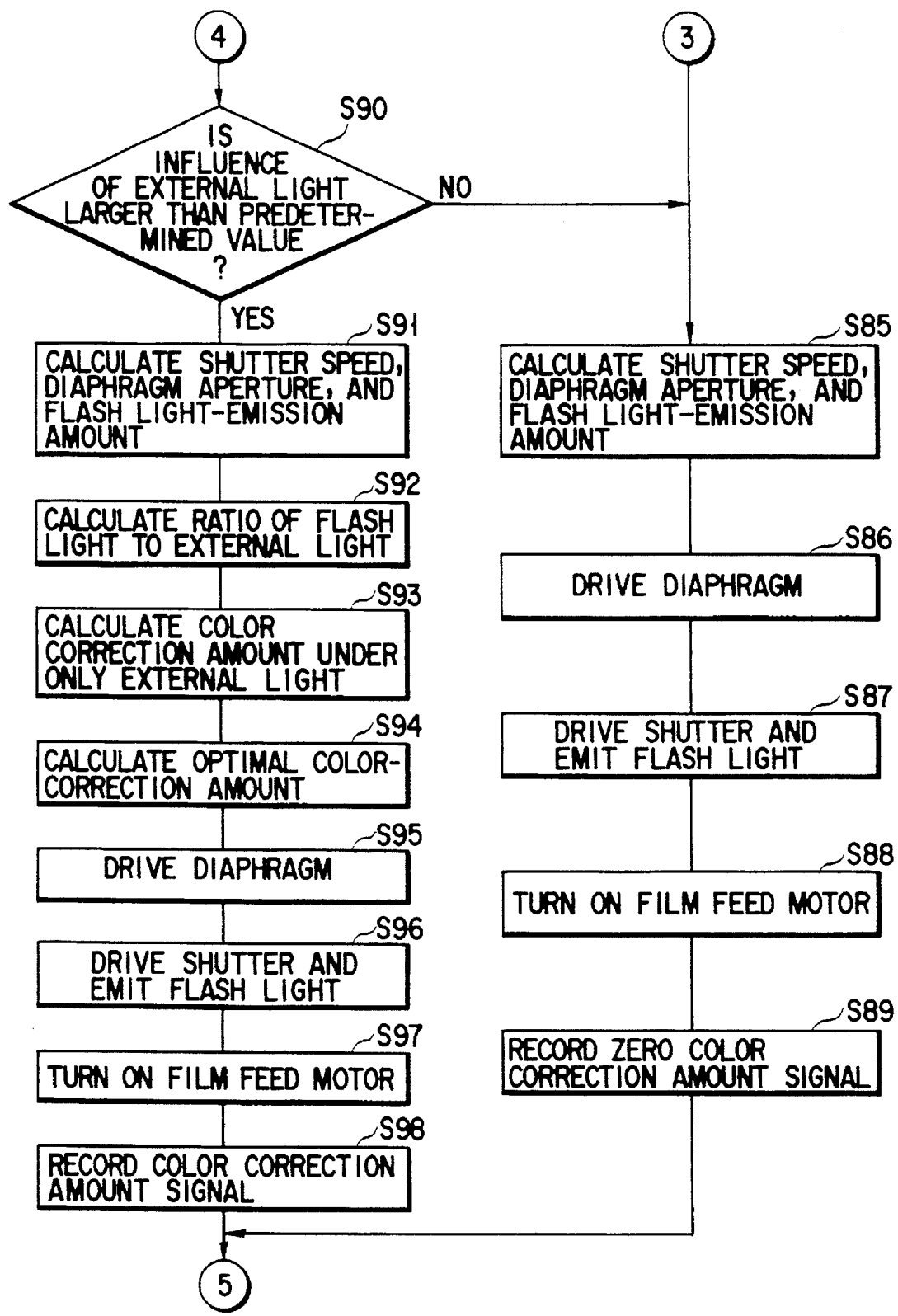

The third embodiment of the present invention will be described next with reference to FIG. 10 and the flow charts shown in FIGS. 13A and 13B.

FIG. 10 shows the ratio of the amount of flash light, to which a film is exposed, to the amount of external light, in relation to the object brightness. Referring to FIG. 10, the abscissa represents the object brightness; and the ordinate, the ratio of the amount of flash light, to which a film is exposed, to the amount of external light, similar to FIG. 8.

When the object brightness is low, the ratio of flash light is very high, and exposure is not influenced much by external light. For this reason, color correction is not generally required. When, however, flash photography is performed while the object brightness is high, the influence of external light is increased. Therefore, color correction is required.

If a forced flash light emission signal (not shown) is input by an operation performed by the photographer (step S78), and if it is determined on the basis of an input value from a film speed setting section 16 that the influence of external light is larger than a predetermined amount (step S90), a CPU 10 performs the operations in subsequent steps S91 to S98. Note that steps S71 to S77, steps S79 to S84, steps S85 to S89, and steps S99 and S100 are the same as steps S1 to S7, steps S8 to S13, steps S16 to S20, and steps S30 and S31 in the flow charts shown in FIGS. 11A and 11B, and hence a description thereof will be omitted.

A proper aperture value, a proper shutter speed, and a proper flash light-emission amount are calculated on the basis of input values from the photometric section 14, the film speed setting section 16, and a distance measuring section 18 (step S91). The ratio of flash light radiated on the object to external light is calculated (step S92). A color tone signal input from a colorimetric section 12 is then compared with a reference color tone level, and a color correction amount under only external light is calculated (step S93).

Subsequently, the calculated color correction amount is multiplied by the calculated ratio of external light to calculate an optimal color correction amount for an actual printing operation (step S94). A diaphragm 54 and a shutter 52 are driven/controlled by a driving circuit 26 in accordance with the calculated value. At the same time, an electronic flash unit 50 is controlled to emit flash light by an electronic flash control circuit 24 in accordance with the calculated value while the shutter 52 is open (steps S95 and S96).

When an exposure operation is completed, a film feed motor 56 is operated by the driving circuit 26 to wind up a film 58 by one frame (step S97). At the same time, the calculated color-correction amount signal is output to a write head 30 to record the color correction amount data for a printing operation on the film 58 during the film wind-up operation (step S98).

As described above, in the third embodiment, photography is performed with a proper light amount regardless of the object brightness in flash light emission, and the color tone of light radiated on the object, which changes depending on the object brightness, is calculated and recorded, as color correction data, on the film, thereby allowing optimal color correction in a printing operation.

The fourth embodiment of the present invention will be described next with reference to the flow charts shown in FIGS. 14A and 14B. Note that the arrangement and the basic operation of the fourth embodiment are the same as those of the first embodiment, and hence a description thereof will be omitted.

In the above-described first to third embodiments, a color correction amount is determined in accordance with the light emission amount of the electronic flash unit. In the fourth embodiment, however, a color correction amount is determined in consideration of the ratio of flash light to external light.

Figure 14A:
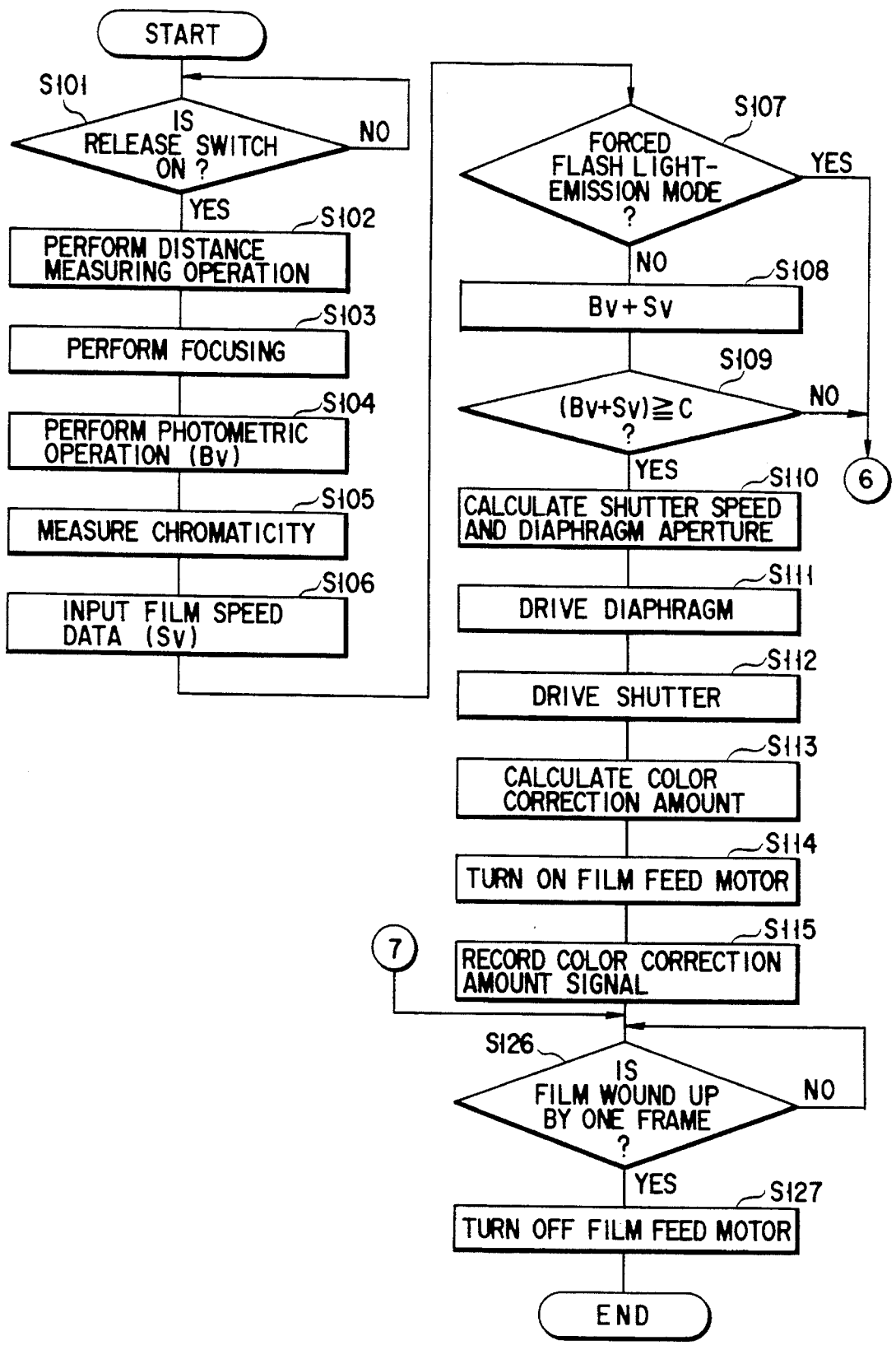
FIGS. 14A and 14B are flow charts for explaining an operation of a camera according to the fifth embodiment of the present invention.
Figure 14B:
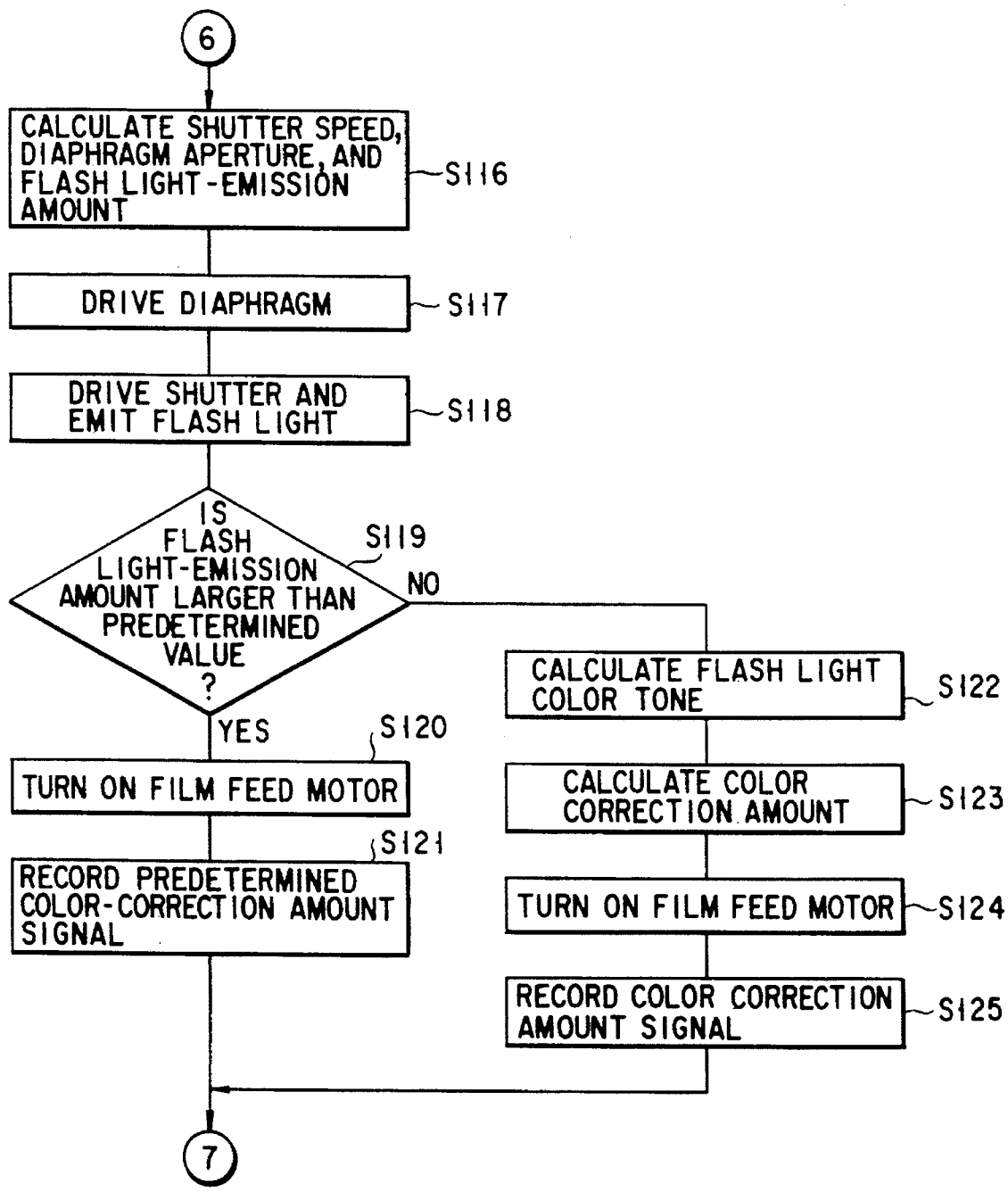

In the flow charts shown in FIGS. 14A and 14B, after film speed data is input (step S106), it is checked whether a forced flash light-emission mode is set (step S107). If the forced flash light-emission mode is not set, an exposure amount is calculated (step S108), and it is checked whether an exposure amount (By+Sv) is larger than a predetermined value (C) to determine whether to perform flash light emission (step S109).

Assume that it is determined in step S107 that the forced flash light emission mode is set, and that it is determined in step S109 that the exposure amount is smaller a predetermined value, and flash light emission is required. In this case, a proper shutter speed, a proper aperture value, and a proper flash light-emission amount are calculated on the basis of the object distance and the film speed (step S116). After a shutter driving operation (step S117) and flash light emission (step S118) are completed, it is checked whether the calculated flash light-emission amount is larger than a predetermined amount (step S119).

If it is determined that the flash light-emission amount is larger than the predetermined value, a CPU 10 operates a film feed motor 56 (step S120), similar to the above-described case. A predetermined value corresponding to the difference between the color tone of flash light and a reference color tone level is recorded, as color correction data, on a film 58 (step S121).

If the flash light-emission amount is smaller than the predetermined value, the emission color tone changes owing to the characteristics of a xenon tube in an electronic flash unit 50. Therefore, an emission color tone corresponding to the flash light-emission amount is calculated by a predetermined calculation method (step S122). A color correction amount corresponding to the difference between the emission color tone and a neutral color tone is calculated (step S123). The film feed motor 56 is turned on (step S124). Thereafter, color correction amount data for a printing operation is recorded on the film 58 during a film wind-up operation (step S125).

Note that steps S101 to S106, steps S110 to S115, and steps S126 and S127 are the same as steps S1 to S6, steps S8 to S13, and steps S30 and S31 in the flow charts shown in FIGS. 11A and 11B, and hence a description thereof will be omitted.

In the fourth embodiment, even if the emission color tone slightly changes depending on the flash light-emission amount, since color tone correction amount data obtained in consideration of such change is recorded on a film, a photograph having an accurate color tone can always be obtained.

In the first to fourth embodiments, a reflection type colorimetric means is used. However, the present invention is not limited to this. For example, the present invention may employ an incident type colorimetric means having white optical filters respectively arranged in front of the optical filters 34a, 34b, and 34c.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera, in which a film having a data recording portion can be loaded, said camera comprising:

colorimetric means having three light receiving portions differing in spectral sensitivity, for measuring a tone of light surrounding an object to be photographed based on an output from the three light receiving portions, said light receiving portions being arranged on a front portion of the camera and arranged so as to receive light at a range larger than an angle of a photographed view;

color correction amount determining means for determining a color correction amount during a printing operation based on an output of said colorimetric means;

recording means for recording data as to the determined color correction amount, on the data recording portion of the film;

flash light emission means for radiating flash light onto the object during an exposure operation of the camera;

photometric means for measuring a brightness of said object at one of a range roughly equal to the angle of the photographed view and a range of a part of the angle of the photographed view, and for outputting brightness data of the object;

ratio determining means for determining a ratio of surrounding light to said flash light with respect to the object during the exposure operation which employs the flash light emission means, by using one of the brightness data and data based on said brightness data; and color correction amount changing means for changing an output of said color correction amount determining means in accordance with the determined ratio of the surrounding light to the flash light.

2. A camera according to claim 1, wherein:

a light receiving range of each of said light receiving portions includes a range of the angle of the photographed view; and a center of each of the light receiving ranges is set to be higher than a center of the angle of the photographed view.

3. A camera comprising:

a camera main body in which a film having a data recording portion is loaded;

photometric means for measuring a brightness of an object to be photographed at one of a range roughly equal to an angle of a photographed view and a range of a part of the angle of the photographed view, and for outputting brightness data of the object;

flash light emission means for radiating flash light onto the object during an exposure operation of the camera in accordance with the object brightness data;

colorimetric means for measuring a color tone of surrounding light, a colorimetric range of the colorimetric means being set to include said angle of the photographed view and to be larger than the angle of the photographed view so as to avoid influence of the color tone of the object within the angle of the photographed view;

first color correction data output means for calculating the measured tone and a preset reference color tone, and for outputting first color correction data;

ratio referring means for table-referring a ratio of the surrounding light to the flash light with respect to said object during the exposure operation which employs the flash light emission means, by using one of the brightness data and data based on the brightness data;

second color correction data output means for multiplying the first color correction data by the ratio obtained by said ratio referring means, and for outputting second color correction data; and recording means for selecting said first color correction data when said exposure operation is performed without using said flash light emission means, for selecting the second color correction data when said exposure operation is performed by using the flash light emission means, and for recording the selected color correction data on the data recording portion of the film while the film is wound up.

4. A camera, in which a film having a data recording portion is used, said camera comprising:

an electronic flash light unit for radiating flash light onto an object to be photographed within a photographic region;

colorimetric means for measuring a color tone of light surrounding the object, the colorimetric means being arranged on a front portion of said camera, a colorimetric range of the colorimetric means being set such that the colorimetric means measures light at a range larger than said photographic region;

calculating means for calculating a color correction amount by comparing the measured color tone with a predetermined reference color tone level;

ratio determining means for determining a ratio of external light to said flash light with respect to said object when said electronic flash unit is used during an exposure operation of the camera, by using at least one of data including a brightness of the object, a distance to the object, an exposure time with respect to a film surface, and an aperture value of a photographic optical system;

color correction amount changing means for changing an output of said ratio determining means in accordance with said ratio of the surrounding light to the flash light; and recording means for recording a color correction amount changed by said changing means on said data recording portion of the film.

5. A camera according to claim 4, wherein said recording means executes a recording operation on said data recording portion of the film while the film is wound up.

6. A camera, in which a film having a data recording portion is usable, said camera comprising:

colorimetric means, arranged on a front portion of the camera, for measuring a color tone of light at a predetermined range which includes an angle of a photographed view and which is larger than the angle of the photographed view;

color correction amount determining means for determining a color correction amount during a printing operation based on an output of said colorimetric means;

recording means for recording data based on the color correction amount, on said data recording portion of the film;

flash light emission means for radiating flash light onto a region including the angle of the photographed view during an exposure operation of the camera with respect to a film surface;

colorimetric means for measuring a brightness of one of the angle of the photographed view and a part thereof;

calculating means for calculating a ratio of the flash light to environmental light of the angle of the photographed view during the exposure operation, by using one of output data of said colorimetric means and data based on the output data; and color correction amount changing means for changing an output of said color correction amount determining means in accordance with the calculated ratio output from said calculating means.

* * * * *